US010883859B2

(12) United States Patent
Czerny et al.

(10) Patent No.: US 10,883,859 B2
(45) Date of Patent: Jan. 5, 2021

(54) FAIL-SAFE SPEED MONITORING OF A DRIVE

(71) Applicant: Siemens Aktiengesellschaft, Munich (DE)

(72) Inventors: Werner Czerny, Hoechstadt (DE); Martin Meinardus, Nuremberg (DE); Wolf-Martin Rasenack, Marloffstein (DE); Iuliu Vlaic, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/062,782

(22) PCT Filed: Nov. 10, 2016

(86) PCT No.: PCT/EP2016/077273
§ 371 (c)(1),
(2) Date: Jun. 15, 2018

(87) PCT Pub. No.: WO2017/102189
PCT Pub. Date: Jun. 22, 2017

(65) Prior Publication Data
US 2019/0339098 A1  Nov. 7, 2019

(30) Foreign Application Priority Data

Dec. 17, 2015  (EP) .................................... 15200824

(51) Int. Cl.
*B65H 26/00* (2006.01)
*G01D 5/244* (2006.01)
(Continued)

(52) U.S. Cl.
CPC ......... *G01D 5/24461* (2013.01); *B65H 18/18* (2013.01); *G01D 5/24466* (2013.01); *H02H 7/0844* (2013.01); *H02H 7/093* (2013.01)

(58) Field of Classification Search
CPC .......... G01D 5/24461; G01D 5/24466; H02H 7/0844; H02H 7/093; B65H 18/18;
(Continued)

(56) References Cited

U.S. PATENT DOCUMENTS 9,527,690 B2 * 12/2016 Merkel ................ B65H 20/005
2002/0161492 A1  10/2002 Eckardt et al.
2015/0001270 A1   1/2015 Merkel et al.

FOREIGN PATENT DOCUMENTS

AU     2003287893      7/2004
CN        1830746      9/2006
(Continued)

OTHER PUBLICATIONS

Office Action dated Dec. 2, 2019 issued in Chinese Patent Application No. 201680073876.6.

*Primary Examiner* — Toan M Le
(74) *Attorney, Agent, or Firm* — Cozen O'Connor

(57) ABSTRACT

A method for fail-safe monitoring of the speed of a drive that includes at least a converter, a motor, and a rotational speed sensor, wherein a target rotational speed is specified to the drive and an actual rotational speed is sensed via the sensor, where a substitute rotational speed is calculated and three plausibility checks are performed in a safety program of a safety CPU, the substitute rotational speed being determinable, for example, from the initial frequency of a converter or from the quotient of EMF and magnetic flux, in each case two of the following three values being checked: target rotational speed, actual rotational speed and substitute rotational speed to achieve a high safety integrity level while avoiding disadvantages of conventional solutions, and because the calculated substitute rotational speed is independent of the sensor, even sensor errors that are difficult or impossible to detect via conventional solutions become detectable.

6 Claims, 2 Drawing Sheets

(51) Int. Cl.
*B65H 18/18* (2006.01)
*H02H 7/08* (2006.01)
*H02H 7/093* (2006.01)

(58) Field of Classification Search
CPC ........ B65H 26/00; B65H 26/02; B65H 23/18; B65H 23/185; B65H 23/188; B65H 23/192; B65H 23/198; G01P 3/48
See application file for complete search history.

(56) References Cited

FOREIGN PATENT DOCUMENTS

| | | |
|---|---|---|
| CN | 101332618 | 12/2008 |
| DE | 10163010 | 11/2002 |
| DE | 10261450 | 7/2004 |
| DE | 102009038060 | 3/2011 |
| DE | 102011009927 | 8/2012 |
| DE | 102012203002 | 8/2013 |
| DE | 102012219914 | 4/2014 |
| WO | WO 2004/059829 | 7/2004 |

\* cited by examiner

FAIL-SAFE SPEED MONITORING OF A DRIVE

CROSS-REFERENCE TO RELATED APPLICATIONS

This is a U.S. national stage of application No. PCT/EP2016/077273 filed Nov. 10, 2016. Priority is claimed on EP Application No. 15200824 filed Dec. 17, 2015, the content of which is incorporated herein by reference in its entirety.

BACKGROUND OF THE INVENTION

1. Field of the Invention

The invention relates to a method for fail-safe monitoring of the speed of a drive, which has at least a converter, a motor and a rotational speed sensor, wherein a target rotational speed is specified to the drive and an actual rotational speed is captured by means of the rotational speed sensor, and also relates to a system comprising at least one drive, which has at least the converter, the motor and the rotational speed sensor, and means for performing the cited method, where the cited method is used to indirectly monitor the web speed of a material web which is moved by rollers in a paper machine, reel slitter or coater.

2. Description of the Related Art

It is known to deploy a method or system particularly where speed monitoring of drives is required to occur as far as possible with a high "Safety Integrity Level" (SIL, as defined by, e.g., International Electrotechnical Commission/European Norms (IEC/EN) Standard 62061). In this case, the use of the cited method is particulary applicable as a further development in solutions such as those described in WO 2013/127815 A1.

Conventional solutions for fail-safe speed monitoring use special safety rotational speed sensors or external hardware, sine-cosine sensors and safety-certified sensor attachments for this purpose. These solutions are, however, resource-intensive and expensive.

SUMMARY OF THE INVENTION

In view of the foregoing, it is an object of the invention to provide a method for fail-safe monitoring of the speed of a drive, in a manner that overcomes the disadvantages of the conventional solutions.

This and other objects and advantages are achieved in accordance with the invention by a method and system, in which a substitute rotational speed is calculated and a plausibility check is performed in a safety program of a safety CPU using in each case two of the following three values: target rotational speed, actual rotational speed and substitute rotational speed.

In accordance with the invention, fail-safe speed monitoring is realized via a calculation method in the software using the existing/conventional hardware, i.e., there is no requirement for special hardware such as that required in conventional solutions (safety sensors, etc.). Here, the substitute rotational speed is calculated from the output frequency of the converter in the case of three-phase drives, and from the quotient of EMF (electromotive force or terminal voltage) and magnetic flux in the case of direct-current drives. By virtue of the three plausibility checks (target rotational speed—actual rotational speed, actual rotational speed—substitute rotational speed, substitute rotational speed—target rotational speed) it is possible to achieve safety levels that could previously only be achieved via hardware solutions.

It is also possible to detect sensor errors that are difficult (via error exclusions) or impossible to detect using existing hardware solutions. For a method without the calculated substitute rotational speed, the feedback of target value and actual value (actual value captured by sensor) via closed-loop control does not allow the detection of all sensor errors that must be detected in order to achieve fail-safe speed monitoring, such as constant slip between sensor and sensor shaft. The calculated substitute rotational speed is independent of the sensor. As a result, these errors are also detected by the method in accordance with the invention.

In an advantageous embodiment, at least one of the following criteria is verified in each of the plausibility checks: at least one value changes continuously, the difference between both values lies within a specified tolerance, and the difference between both values changes continuously.

By checking whether a value and/or the difference between both values changes continuously, it is possible to check whether noise is present on the value, or the difference between both values is checked for noise respectively. If the difference between both values lies within a specified tolerance, both values at least largely coincide. If at least one of the verified criteria is not satisfied, i.e., no noise is present and/or the respective values do not coincide, then the corresponding plausibility check is negative.

In a further advantageous embodiment, the actual rotational speed and/or the substitute rotational speed are checked in the safety program to determine whether they exceed at least one specified positive limit value, or whether they do not reach at least one specified negative limit value. The calculated substitute rotational speed is independent of the sensor. Consequently, verifying whether the substitute rotational speed exceeds a limit value ensures the safety of the system even in the case of certain sensor errors (e.g., constant slip between sensor and sensor shaft).

In a further advantageous embodiment, a warning signal is output and/or the motor is switched off if the positive limit value is exceeded or the negative limit value is not reached. The output of a warning signal allows an operator to adopt suitable measures and if applicable to additionally switch the motor off manually. However, the limit value can also be specified such that the motor is switched off immediately.

In a further advantageous embodiment, a warning signal is output and/or the motor is switched off if at least one plausibility check returns a negative result. The output of a warning signal allows an operator to adopt suitable measures and if applicable to additionally switch the motor off manually. However, the limit value can also be specified such that the motor is switched off immediately.

In an advantageous embodiment of the system, the converter has means for calculating the substitute rotational speed. The compliance with a high safety integrity level is not affected as a result of performing this simple calculation directly in the converter instead of the safety CPU.

The method in accordance with the invention is particularly and advantageously suitable for indirectly monitoring the web speed of a material web that is moved by rollers in a paper machine, reel slitter or coater. A material web in this case is understood to be a web of a flat material, e.g., made of paper, plastic or metal.

In machines having continuous material webs moved by rollers, the circumferential speeds of the driving rollers and the related web speed of the material webs must be monitored. In particular, two speed threshold values must be taken into account: a maximum mechanical web speed which must not be exceeded in order to prevent damage to the machine, and a so-called safe speed that allows the operators to enter hazardous areas while the machine is in motion, e.g., in order to perform maintenance work.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in greater detail below with reference to the exemplary embodiment illustrated in the figures, in which.

DETAILED DESCRIPTION OF THE EXEMPLARY EMBODIMENTS

Figure 1:
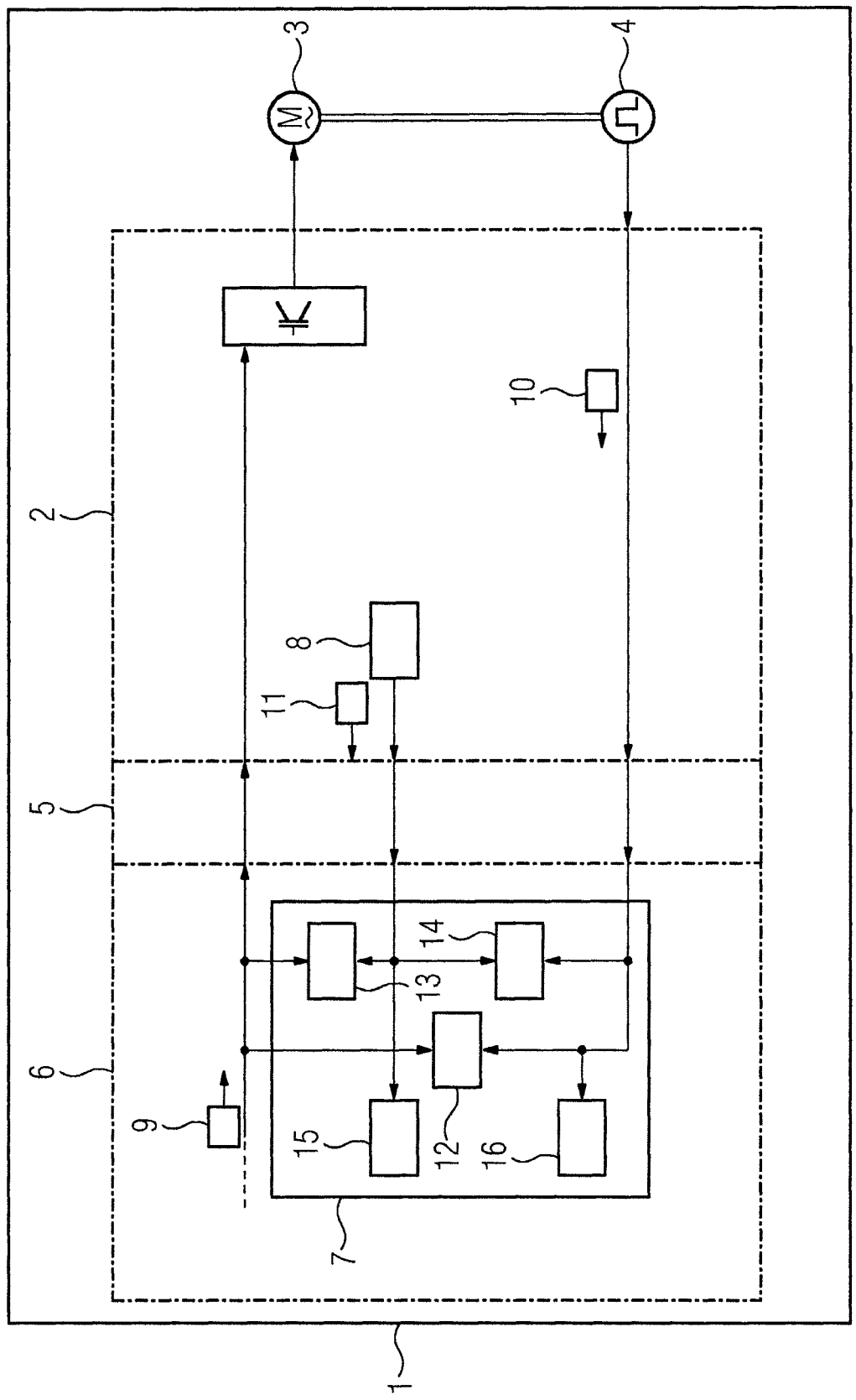
FIG. 1 is a schematic illustration of fail-safe speed monitoring in accordance with the invention.

FIG. 1 shows a system 1 comprising a drive, which has a converter 2, a motor 3 and a rotational speed sensor 4, and a safety CPU 6 with a safety program 7. Converter 2 and safety CPU 6 are coupled together, e.g., via a field bus 5 as a communication connection. In the exemplary embodiment illustrated, the converter 2 itself has means 8 for calculating a substitute rotational speed 11. The substitute rotational speed 11 here is calculated from the output frequency of the converter 2 in the case of three-phase drives or the quotient of EMF (electromotive force or terminal voltage) and magnetic flux in the case of direct-current drives. A target rotational speed 9 is specified to the converter 2, and the rotational speed sensor 4 returns an actual rotational speed 10.

Two of these three rotational speed values are now each verified in the safety program 7 of the safety CPU 6 for plausibility, i.e., a plausibility verification 12 occurs between the target rotational speed 9 and the actual rotational speed 10, a plausibility verification 13 occurs between the target rotational speed 9 and the substitute rotational speed 11 and a plausibility verification 14 occurs between the substitute rotational speed 11 and the actual rotational speed 10. In each plausibility verification 12, 13, 14, it is advantageously verified whether at least one of the respective values changes continuously, i.e., is loaded with noise, whether the difference between both values moves within a specified tolerance range, i.e., both values at least largely coincide (but do not continuously coincide exactly), and whether the difference between both values changes continuously (i.e., likewise whether noise is present). If all three plausibility checks 12, 13, 14 are positive, the rotational speed of the motor 3 is assumed to be safe.

In addition, both the actual rotational speed 10 and the substitute rotational speed 11 are verified 15, 16 in order to determine whether a limit value is exceeded. It is thereby possible to ensure the safety of the system 1 even in the case of certain sensor errors (e.g., constant slip between sensor and sensor shaft), which are otherwise impossible or difficult (via error exclusions) to identify.

In summary, the invention relates to fail-safe monitoring of the speed of a drive, which has at least a converter, a motor and a rotational speed sensor, wherein a target rotational speed is specified to the drive and an actual rotational speed is captured by means of the rotational speed sensor. In order to achieve a high safety integrity level while avoiding the disadvantages of known solutions, a substitute rotational speed is calculated and a plausibility check is performed in a safety program of a safety CPU using in each case two of the following three values: target rotational speed, actual rotational speed and substitute rotational speed. The calculated substitute rotational speed is independent of the sensor. Consequently, it is also possible to detect sensor errors that are impossible or difficult (via error exclusions) to detect using existing hardware solutions.

Figure 2:
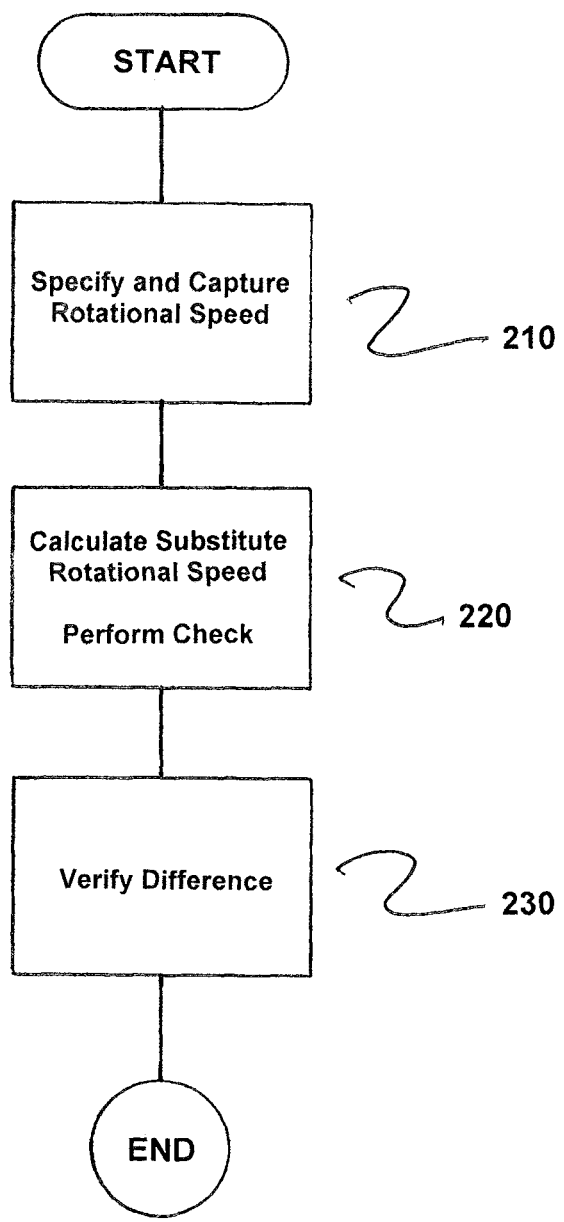
FIG. 2 is a flowchart of the method in accordance with the invention.

FIG. 2 is a flowchart of a method for fail-safe monitoring of the speed of a drive to indirectly monitor web speed of a material web which is moved by rollers, where the drive includes at least a converter 2, a motor 3 and a rotational speed sensor 4. The method comprises specifying a target rotational speed 9 to the drive and capturing an actual rotational speed 10 by the rotational speed sensor 4, as indicated in step 210.

Next, calculating a substitute rotational speed 11 is calculated and a plausibility check 12-14 is performed in a safety program 7 of a safety CPU 6 using in each case two of the following three values: (i) target rotational speed 9, (ii) actual rotational speed 10 and (iii) substitute rotational speed 11, a indicated in step 220. In accordance with the invention, the substitute rotational speed (11) is calculated from one of (i) an output frequency of the converter 2 in cases of three-phase drives and (ii) from a quotient of terminal voltage and magnetic flux in cases of direct-current drives, where the plausibility check 12, 13, 14 occurs in each case (i) between the target rotational speed 9 and the actual rotational speed 10, (ii) between the target rotational speed 9 and the substitute rotational speed 11, and (iii) between the actual rotational speed 10 and the substitute rotational speed 11.

Next, during the plausibility checks 12, 13, 14, a check is performed to verify whether a difference between two of the three values changes continuously, as indicated in step 230.

In accordance with the invention, at least one of (i) the actual rotational speed 10 and (ii) the substitute rotational speed (11) are checked 15, 16 in the safety program 7 to determine whether one of (i) the at least one of the actual rotational speed 10 and the substitute rotational speed 11 exceed at least one specified positive limit value and (ii) the at least one of the actual rotational speed 10 and the substitute rotational speed 11 do not reach at least one specified negative limit value.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for fail-safe monitoring of the speed of a drive to indirectly monitor web speed of a material web which is moved by rollers, said drive having at least a converter, a motor and a rotational speed sensor, the method comprising:
specifying a target rotational speed to the drive and capturing an actual rotational speed by the rotational speed sensor;
determining a substitute rotational speed and performing a plausibility check in a safety program of a safety CPU using in each case two of the following three values: (i) target rotational speed, (ii) actual rotational speed and (iii) substitute rotational speed, the substitute rotational speed being determined from one of (i) an output frequency of the converter in cases of three-phase drives and (ii) from a quotient of terminal voltage and magnetic flux in cases of direct-current drives, a plausibility check occurring in each case (i) between the target rotational speed and the actual rotational speed, (ii) between the target rotational speed and the substitute rotational speed, and (iii) between the actual rotational speed and the substitute rotational speed; and
verifying during the plausibility checks whether a difference between two of the three values changes continuously;
wherein at least one of (i) the actual rotational speed and (ii) the substitute rotational speed are checked in the safety program to determine whether one of (i) the at least one of the actual rotational speed and the substitute rotational speed exceed at least one specified positive limit value and (ii) the at least one of the actual rotational speed and the substitute rotational speed do not reach at least one specified negative limit value.

2. The method as claimed in claim 1, wherein at least one of (i) a warning signal is output and (ii) the motor is switched off if one of (i) the positive limit value is exceeded and (ii) the negative limit value is not reached.

3. The method as claimed in claim 1, wherein at least one of (i) a warning signal is output and (ii) the motor is switched off if at least one plausibility check returns a negative result.

4. The method as claimed in claim 1, wherein the material web is moved by rollers in one of (i) a paper machine, (ii) reel slitter or (iii) coater.

5. A system comprising:
at least one drive for a material web which is moved by rollers, said drive having:
at least a converter;
a motor;
a rotational speed sensor; and
a safety CPU;
wherein the safety CPU includes at least a safety program which when executed by the safety CPU:
specifies a target rotational speed to the drive and captures an actual rotational speed via the rotational speed sensor;
determines a substitute rotational speed and performs a plausibility check using in each case two of the following three values: (i) target rotational speed, (ii) actual rotational speed and (iii) substitute rotational speed, the substitute rotational speed being determined from one of (i) an output frequency of the converter in cases of three-phase drives and (ii) from a quotient of terminal voltage and magnetic flux in cases of direct current drives, a plausibility check occurring in each case (i) between the target rotational speed and the actual rotational speed, (ii) between the target rotational speed and the substitute rotational speed, and (iii) between the actual rotational speed and the substitute rotational speed; and
verifies during the plausibility checks whether a difference between two of the three values changes continuously;
wherein at least one of (i) the actual rotational speed and (ii) the substitute rotational speed are checked to determine whether one of (i) the at least one of the actual rotational speed and the substitute rotational speed exceed at least one specified positive limit value and (ii) the at least one of the actual rotational speed and the substitute rotational speed do not reach at least one specified negative limit value.

6. The system as claimed in claim 5, wherein the converter outputs the substitute rotational speed.

* * * * *